US011528467B1

(12) United States Patent
Rao

(10) Patent No.: US 11,528,467 B1
(45) Date of Patent: Dec. 13, 2022

(54) SYSTEM AND METHOD FOR MESSAGING CHANNELS, STORY CHALLENGES, AND AUGMENTED REALITY

(71) Applicant: Sanjay K Rao, Palo Alto, CA (US)

(72) Inventor: Sanjay K Rao, Palo Alto, CA (US)

( * ) Notice: Subject to any disclaimer, the term of this patent is extended or adjusted under 35 U.S.C. 154(b) by 0 days.

(21) Appl. No.: 16/828,954

(22) Filed: Mar. 25, 2020

Related U.S. Application Data

(63) Continuation of application No. 15/593,291, filed on May 11, 2017, now Pat. No. 10,638,122.

(60) Provisional application No. 62/335,669, filed on May 12, 2016.

(51) Int. Cl.
| | | |
|---|---|---|
| *G06F 16/00* | (2019.01) | |
| *H04N 13/344* | (2018.01) | |
| *H04N 13/398* | (2018.01) | |
| *G06F 3/04883* | (2022.01) | |
| *H04N 21/472* | (2011.01) | |
| *H04N 13/204* | (2018.01) | |
| *G06F 16/587* | (2019.01) | |

(52) U.S. Cl.
CPC ....... *H04N 13/344* (2018.05); *G06F 3/04883* (2013.01); *H04N 13/204* (2018.05); *H04N 13/398* (2018.05); *H04N 21/47217* (2013.01); *G06F 16/587* (2019.01)

(58) Field of Classification Search
CPC ......... G11B 27/34; G11B 27/10; H04L 29/06; H04L 29/08; H04N 19/136; H04N 19/46; H04N 13/344; H04N 13/204; H04N 13/398; H04N 21/47217; G06F 3/04883; G06F 16/58
See application file for complete search history.

(56) References Cited

U.S. PATENT DOCUMENTS

| | | | | |
|---|---|---|---|---|
| 10,102,881 | B2* | 10/2018 | Elsner | H04N 19/46 |
| 10,592,089 | B1* | 3/2020 | Hofmann | H04N 5/77 |
| 2004/0242266 | A1* | 12/2004 | Tagliabue | H04M 1/72439 |
| | | | | 455/556.1 |
| 2006/0090141 | A1* | 4/2006 | Loui | G06F 16/447 |
| | | | | 715/764 |
| 2009/0210793 | A1* | 8/2009 | Yee | G06F 16/58 |
| | | | | 715/723 |
| 2012/0046770 | A1* | 2/2012 | Becker | H04N 21/41407 |
| | | | | 700/94 |
| 2013/0080895 | A1* | 3/2013 | Rossman | G06F 3/04883 |
| | | | | 715/720 |

(Continued)

*Primary Examiner* — Frank F Huang

(57) ABSTRACT

A augmented reality glasses and social networking service coupled with immersive stories, pictures, and 360 video are enabled using one or more wireless communication devices, smart glasses, augmented reality devices, mobile devices, and wireless networks. Picture and video challenges are enabled to drive communication within members of the group. Users are enabled to describe presence for activity using a presence matching and monitoring subsystem. The ability to share stories with a select group of individuals is enabled. The stories may include automatically condensed highlights of an individual or group chat or acquired media. the social networking and messaging platform may have features including issuing status updates with timer clock in which it counts down, creating channels and groups based on events, location and occasions, creating stories based on specific content items from one or more users in one or more channels.

20 Claims, 15 Drawing Sheets

(56) References Cited

U.S. PATENT DOCUMENTS

2015/0269969 A1\* 9/2015 DeYonker .............. G11B 27/34
　　　　　　　　　　　　　　　　　　　386/241

\* cited by examiner

SYSTEM AND METHOD FOR MESSAGING CHANNELS, STORY CHALLENGES, AND AUGMENTED REALITY

This application is a continuation of U.S. patent application Ser. No. 15/593,291, which claims the benefit of the filing date of U.S. Provisional Application Ser. No. 62/335,669 filed on May 12, 2016; the disclosures of U.S. patent application Ser. No. 15/593,291 and U.S. Provisional Application Ser. No. 62/335,669 are hereby incorporated by reference in its entirety.

BACKGROUND

This disclosure generally relates to social networking and user generated content and sharing in social, professional, or other settings. The technical field herein pertains to social networking systems including those that relate to user presence, scheduling, and location image and video capture. Mobile device media content captured lacks a full degree of interactivity as the pictures and videos captured lack for example appropriate spatial orientation and immersive aspects.

SUMMARY

In some embodiments of the present disclosure, mobile devices, wearable devices, and smart phone devices may be enabled to capture rich immersive media content including pictures, videos, and 360 degree content.

Various devices may be used in the platform including mobile devices, tablet devices, smart glasses, augmented reality devices, virtual reality devices, and other communication devices.

Hyperlocal peer to peer social messaging is enabled in which messaging can occur via failover networks and different wireless communication channels. In some embodiments, a messaging system may operate on a first local network and simultaneously operate on a second local network to store and forward messages between a mesh of social networking capable devices. The system enables for real time communication with or without the need for WWAN social networks and cellular connectivity.

Various presence protocols may be enabled such as Extensible Messaging and Presence Protocol (XMPP) and the proprietary presence methods may be layered on top of this platform.

The present disclosure enables for sets of media content to be grouped together into a story as an example or other media content. For example, a story may be created based on a similar posts or content units within one or of time periods, interests, topics, or users.

The present disclosure enables the mobile device or user to capture 360 videos for immersive virtual reality and augmented reality content creation and consumption.

In various instances, a story may be created with multiple users and multiple different perspectives and vantage points by creating a sequence of images from a user with users who posted images in a certain related time period in a proximate location. Various channels or content may be accessible based on location maps or geo-fences or maybe integrated into following a sequence or path of locations. That is a story can exist about a particular location at a set time such as sunset on the Golden Gate Park or Central Park stories. They can also exist pertaining to a person or sets of people for example, Jack and Jane last 72 hours events pictures locations wearable data all encapsulated in a content unit with animations. These content units may be browsed as one set wherein a gesture may allow a swipe across the content unit to advance within the stories and swipes up and down may advance to a different story unit.

In various embodiments, a 360 degree story may be created to allow for multiple images to be stitched together into a 360 panoramic view or a video piece with 45 second, 90 sec, or longer segments and times to live. These videos may be created using a virtual reality or augmented reality device and system such as a mobile phone or a smart glasses or smart watch device.

It is an aspect of the disclosure to enable a suite of gestures to allow for interactivity for the social networking application to scan through stories posts and content units including shaking, spinning a mobile device, rubbing the mobile device, pinching the screen of the mobile device, and other factors.

It is an aspect of the present disclosure to enable digital vaults based on locations. As an example a server, database, and other cloud systems may be enabled to store digital data. A user upon entering a secure location such as the center of an office building or the library at a university may be given a hash or other identifier by an access point, local device, Bluetooth LE, Bluetooth device or other communication device. This hash or other authorization may enable the user to access past group chat archives, past digital copies of information, historical details of users, and other information. As an example, individuals who attend a conference or concert may be entitled to download the conference materials or concert clips or see the channels only upon proving location via a plurality of authentication methods including one or more or combinations thereof of sending GPS location to a server; sending a local wifi or Bluetooth location indicator, texting a response, and posting to a channel or group.

It is an aspect of the present disclosure to enable a social network mobile application and wearable application to be used in conjunction with a cloud set of servers. The mobile application may enable users to coordinate activities, notify others of their availability, provide one click availability for their own presence, sort the presence of other individuals based on their location or activity interest, set up individual group chats, or be matched with other members.

It is an aspect of the present disclosure to enable the user or a story creator module to dynamically generate stories based on user posts. As an example, a story may include all of the users activities within the last 24 hours that were posted to one or more social channels, groups, or direct messages. Another story may involve all the posts to a particular group in the past 72 hours. A third story type may include all the pictures associated with two or more users in the past 48 hours. These stories may be animated using animation effects, music, overlay text, current events, maps, and other presentation level software packages.

It is an aspect of the disclosure to enable digests or synthesized stories of sets of content for example in creating a weekend, weekday, or 72 hour story based on user generated posts and/or third party news posts. These stories, posts, and content units may be associated with one or more times to live. That is they may be destroyed from the local copy on a mobile device, wearable device, or server. The stories images videos posts may be associated with a total number of viewers count upon which views it is deleted an no longer available. The content may be associated with particular locations for viewing.

It is an aspect of the present disclosure to enable each of these stories may disappear automatically or specific content units or items such as pictures or videos within these units may be deleted from on or more stories servers or mobile devices. As an example, a user travelling to a country may create a story of their excursions to that country. This story may include all the pictures from this trip in animated short bites. These pictures may then be animated and text or overlay items may be appended. Users may advance within the story by tapping on a content unit in the story item. Each content piece or each story may be configured by a user or server to have a set number of views by certain participants associated with the content unit. Each content unit, content piece, image, set of images, channel, group may have a specified, default or other indicator for a time to live. After such time the content may be set to be deleted.

It is an aspect of the disclosure to image capture and sensor data from a mobile device or wearable device to make a content unit or story comprising of images, videos, sensor data, biometric data, or combinations thereof. As an example, a picture set involving a user running on a park trail may include a video captured by the user on a first mobile device, a map of the run from a mapping server, and a wearable heart rate postings layered on top of the video. In this view an individual may be enabled to see a video of their activity with an overlay image of heart rate. The application or a cloud server device may be enabled to capture this information and stitch multiple objects together. Various objects and image entities may be stitched together into one uniform interface to allow for consumption of an aggregated content unit.

It is an aspect of the present disclosure to enable several gestures to control like, posting, image capture of the device, and navigation on the device. A gesture of multiple taps hard on the center of screen during a content unit viewing may enable the user to express discontent with a content unit. A dual swipe on the right side and left side of the screen may cause a new story to advance.

BRIEF DESCRIPTION OF SEVERAL VIEWS OF THE DRAWING

The accompanying drawings, being incorporated in and forming a part of this specification, illustrate embodiments of the disclosure and, together with the description, serve to explain the principles of the present disclosure.

DETAILED DESCRIPTION

Reference will now be made in detail to the preferred embodiments of the disclosure, examples of which are illustrated in the accompanying drawings. While the disclosure will be described in conjunction with the preferred embodiments, it will be understood that they are not intended to limit the disclosure to those embodiments. On the contrary, the disclosure is intended to cover alternatives, modifications and equivalents, which may be included within the spirit and scope of the disclosure as defined by the appended claims.

It is an aspect of the present disclosure to enable rich media group communication between multiple users that use both mobile devices, virtual reality devices, augmented reality devices, and wearable devices.

Figure 1:
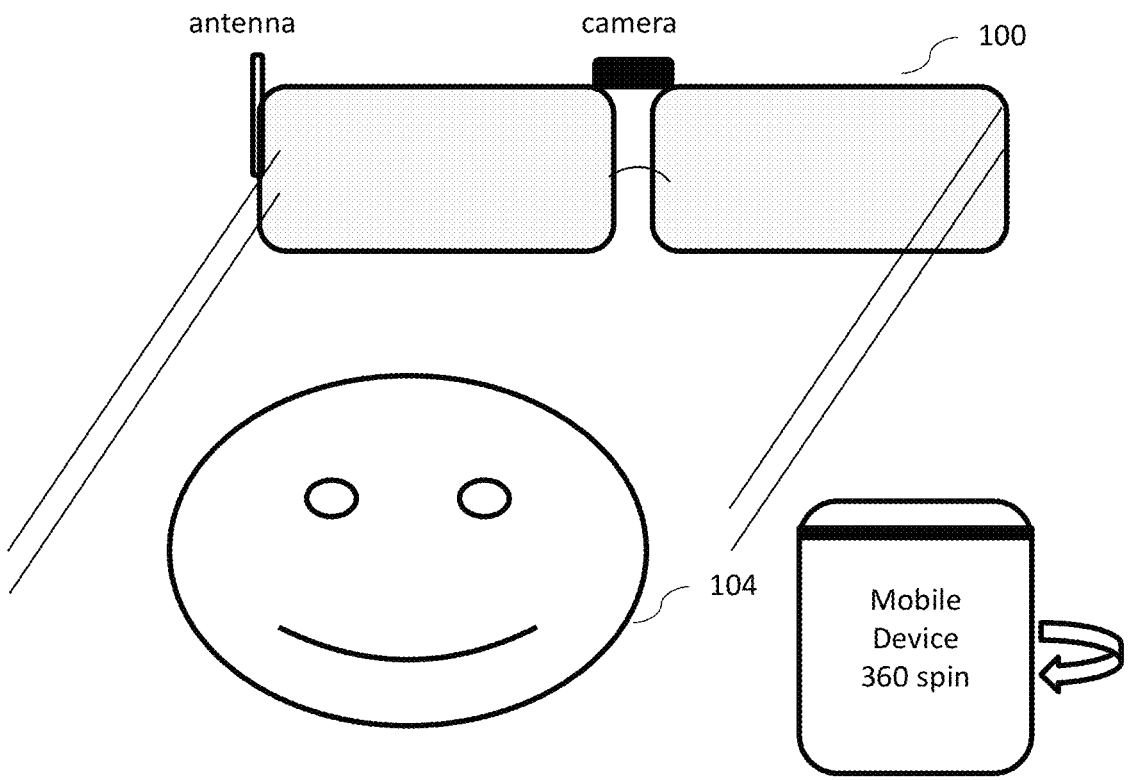
FIG. 1 depicts a wearable computing glasses device for virtual and/or augmented reality chat.
Figure 1:
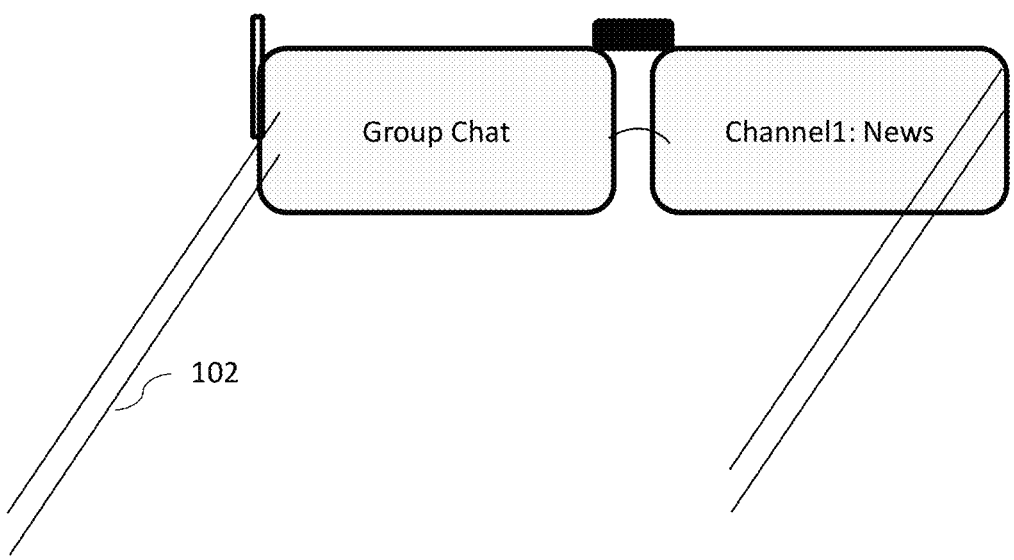

Referring now to FIG. 1, FIG. 1 depicts a smart glasses electronic device in which an individual or user is enabled to capture various videos, images, and media content using an integrated camera device on the smart glasses 100. The smart glasses may be enabled with a plurality of cameras, antennas, and interactive lenses. Haptic responses may be enabled on the rim and frame of the smart glasses. In each lens, a user may be able to see various events, pictures and videos as posted in one or more social networks. The user may be enabled to take a 360 video of various events and happenings. The user may enter the 360 setup and subsequently be advised by the application to spin around in a circular motion 104. The video of the 360 degree circular movement may be done repeatedly to integrate multiple 360 degree views at different angles including facing up in the sky, level, down, or sideways for example. The smart glasses application, mobile device, or cloud server may integrate these different views to create an immersive viewing experience. For example, if an individual attended a conference or concert they may be able to recreate aspects of the conference flow by engaging in an immersive 360 experience. A mobile device or smart glasses may be enabled for the capture of content. These devices may also be enabled for viewing of the content. In various embodiments, the posting to different groups and channels may be undertaken using a single action depression of a button to post. Viewing of content may be based on a collated story, digested message content, or NLP based summary of a conversation. Access to various content may be based on privacy settings, user settings, and behavioral activity accomplishments. In various embodiments, modules may be enabled for dynamic story and or channel creation and curation. For example, a story curator module implemented on a server may select posts from a plurality of channels based on the likability score associated with the post and repurpose these posts for advertisement backgrounds or to showcase in a channel.

Figure 2:
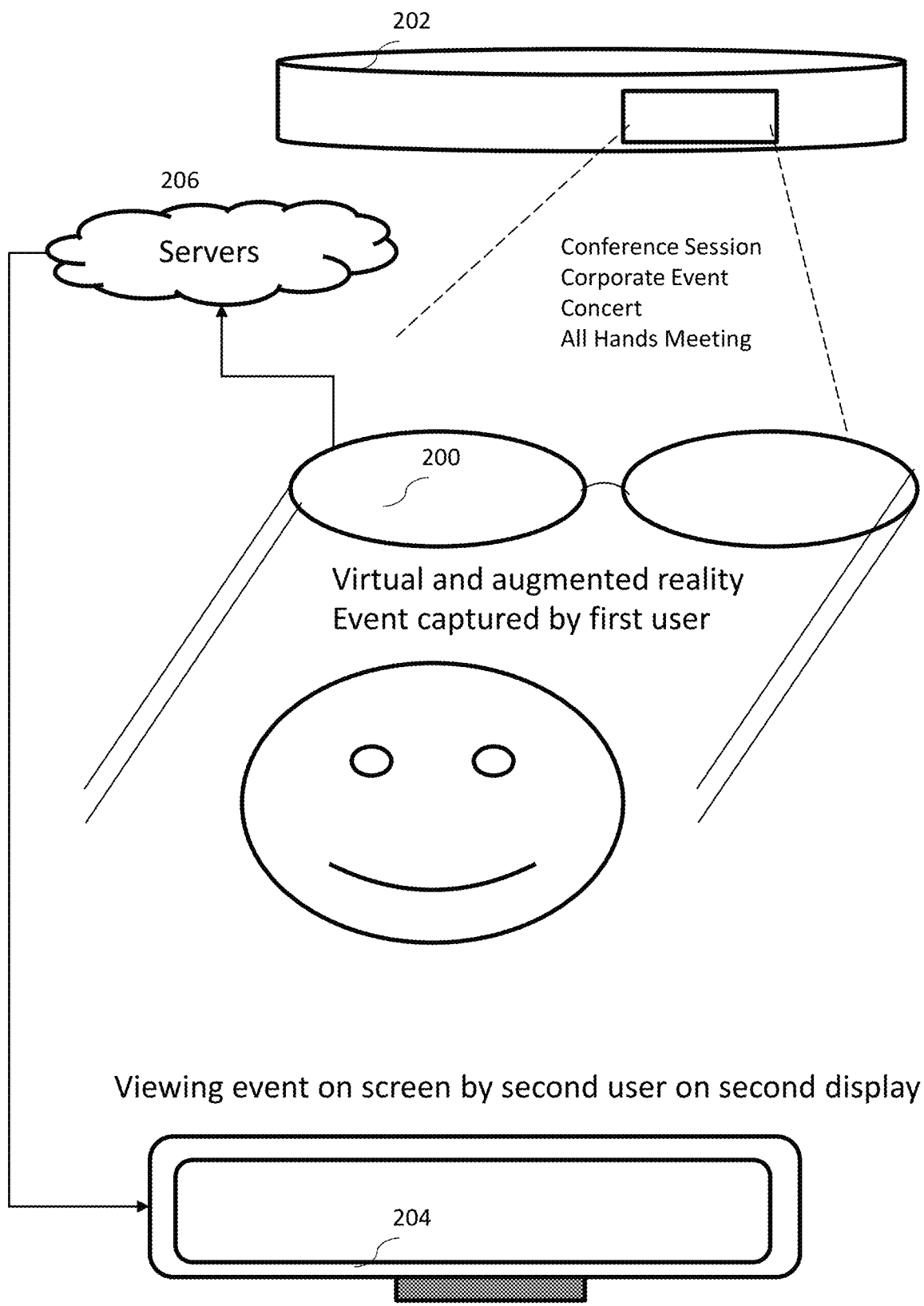
FIG. 2 depicts a virtual and augmented reality glasses device in conjunction with a second screen device.

Referring now to FIG. 2, FIG. 2 depicts a smart glasses system 200 in which an event or conference 202 is broadcast from one user via a camera on a smart glasses via a cloud network 206 to a second screen device 204. The event may be increased with various amounts of augmented reality and virtual reality components such that video recorded is augmented with pictures, advertisements and other components to enhance the experience for the primary user 200 and the secondary viewer 204. The first viewer may be enabled to capture 360 video data via a smart glasses and mobile device simultaneously and use a cloud software system to stitch the two data streams together.

Figure 3:
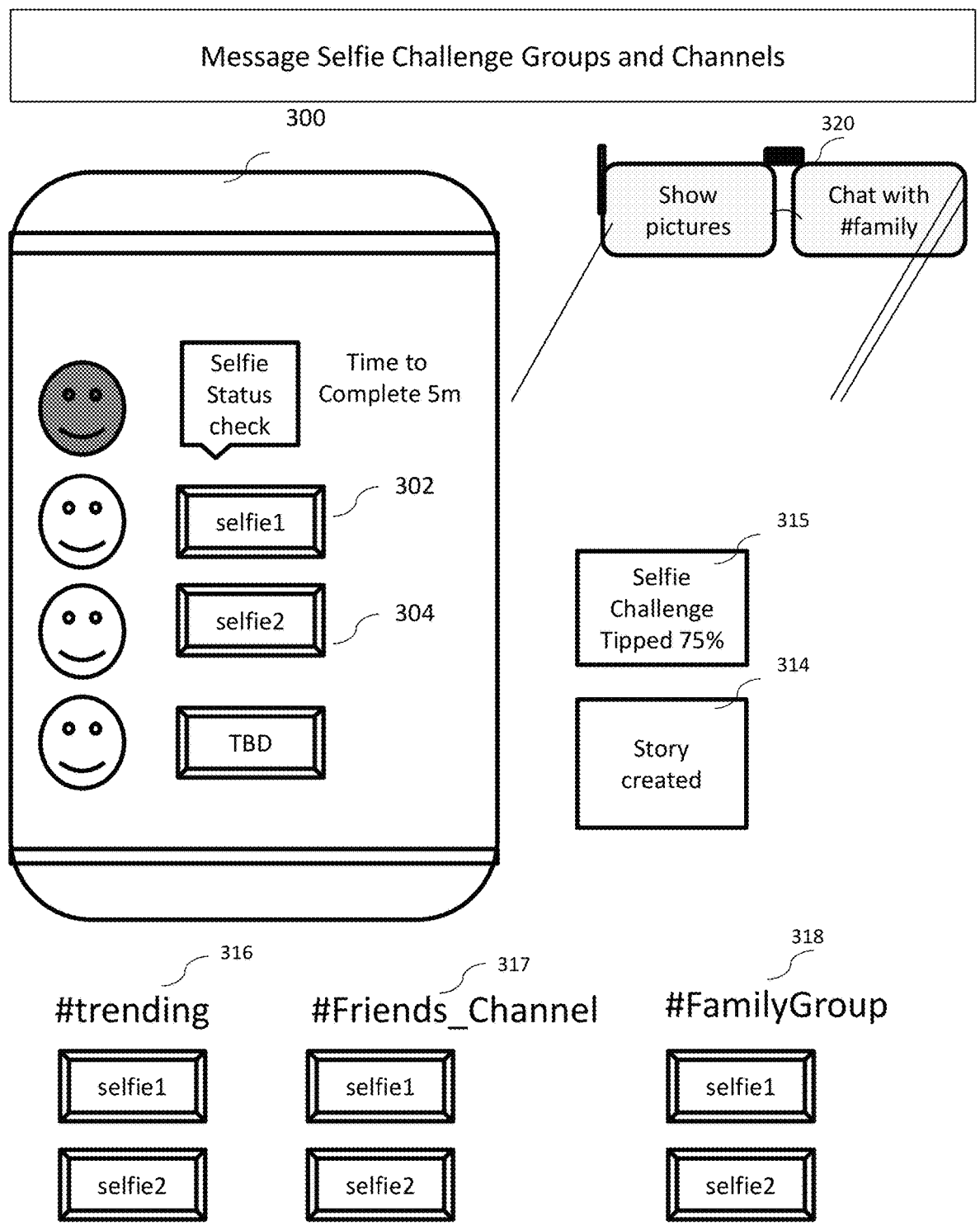
FIG. 3 shows a picture interaction application.

Referring now to FIG. 3, FIG. 3 depicts a secured picture challenge module application. This challenge module application may be structured as a intelligent widget, separate mobile application, integrated into a social networking web or online application. The challenge module may be processed using a local or network server and loaded into memory of the device locally or over the network. A first user may issue a status check and request members of the group, friends, followers, to provide their status including either a write message, picture, video, or other content items 302.

Still referring to FIG. 3, a set of second, third, or fourth users may respond to the challenge within the configurable and defined allotted time stated by the first user. Not all the users need to respond to the challenge to see the results. As an example, user 4 did not respond with an image in the allotted time. In this variation, a secured image content unit may be enabled which comprises of a plurality of image aspects in one overall secured image system. If more than a certain number of responses were collected, then the fourth user will continue to see the result. Therefore, a social network subgroup may see the results even if the fourth user did not provide a response. A threshold value for seeing the pictures may be enabled such as two people responding on the group or 75% of the people responding 312. This may be configurable. Alternatively, a criteria such as posting a picture may enable the user to gain access to a specific channel. When all the image are collected a story 314 may be created which creates on or more animated sequences of pictures and videos 314. These images and content and any messages may be included in various channels and or private group lists automatically including a first channel 316 and a second channel 317 or a first group and a second group 318. An smart glasses device 320 may used to capture events and selfies as they occur, record location and view the results in real time.

Figure 4:
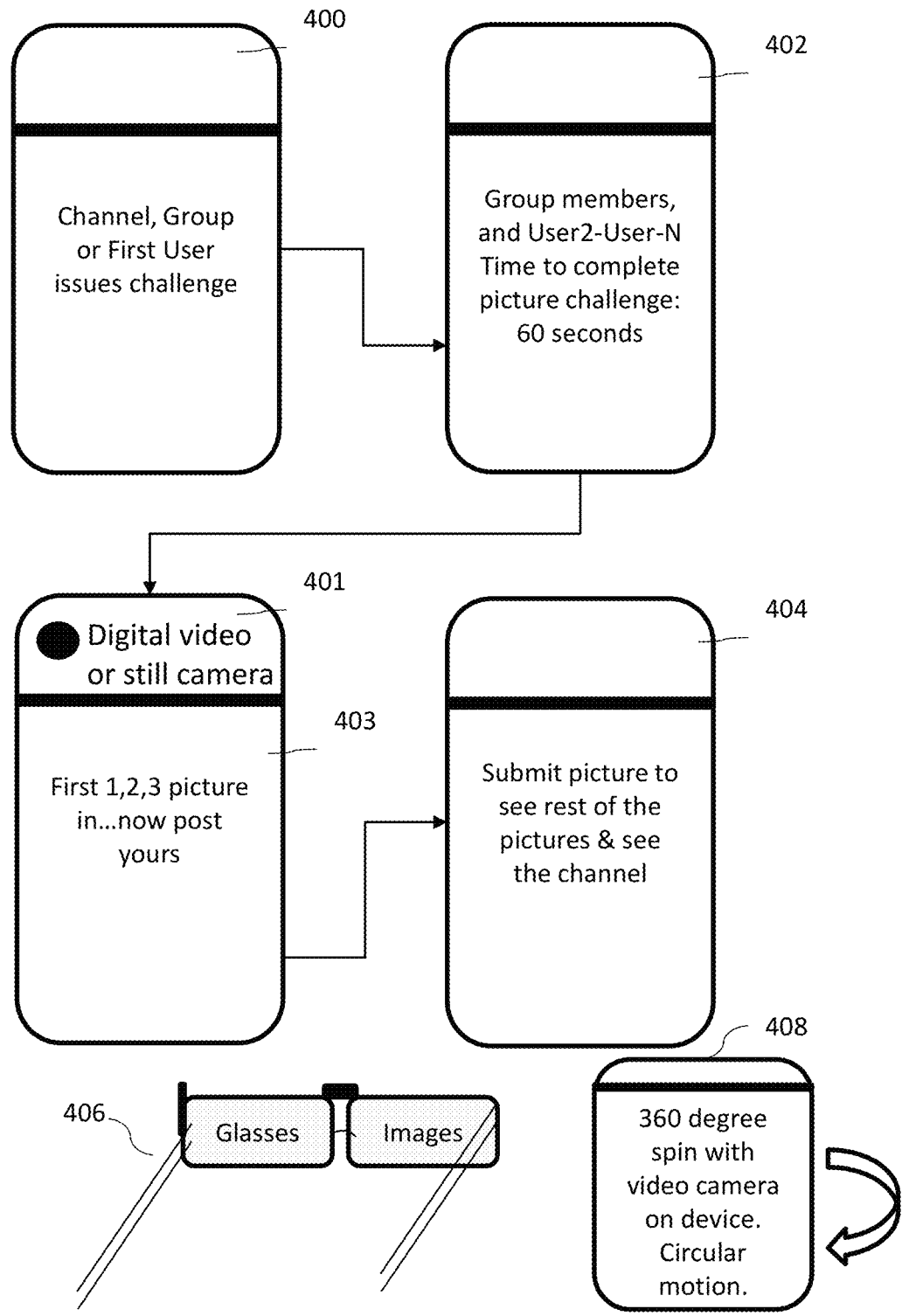
FIG. 4 shows a challenge based content system.

Referring to FIG. 4, depicts an activity challenge for a user to gain access to one or more channels, stories, or groups. A first user may issue a challenge 400 to one or more users in the network to post a picture. For example, a user may automatically send a "status check" to a group of friends. Users may have a set time period to respond with a picture or selfie picture of themselves or an object. The story may be published when the number of responses tips by the number of responses exceeding a preset threshold. At this point the pictures or story may be published to the group. A user may use a digital camera or video camera on a mobile device or wearable device. A set of members may be invited to the challenge 402 based on interests, locations, groups, friends, or other criteria. As the story and responses are received by a server module the indications that pictures are coming in may be indicated on the display of the mobile device 403. The results may be seen on the mobile device or in one or more channels based on the threshold of responses or people 404. Various other communication devices may be used in the capture include virtual reality or augmented reality glasses 406. These glasses may be equipped with various video camera recording instruments, audio recording, microphones, gestures, haptic response, touch enabled controllers, motion sensors, ambient sensors, and other input and output mechanisms. A mobile device or wearable device such as a watch may also be used for 360 video creation. In this instance the user may spin around in a circle while activating the video capture feature on the mobile device 408 and social networking application. This recording feature enables the user to capture multiple videos in a 360 degree experience. The selfie challenge or photo challenge may incorporate a 360 degree video capture challenge. The 360 degree video may then be annotated or animated with other overlays and filters. A user may also request 360 videos from other participants in issuing a request for photo, video, or other media.

Figure 5:
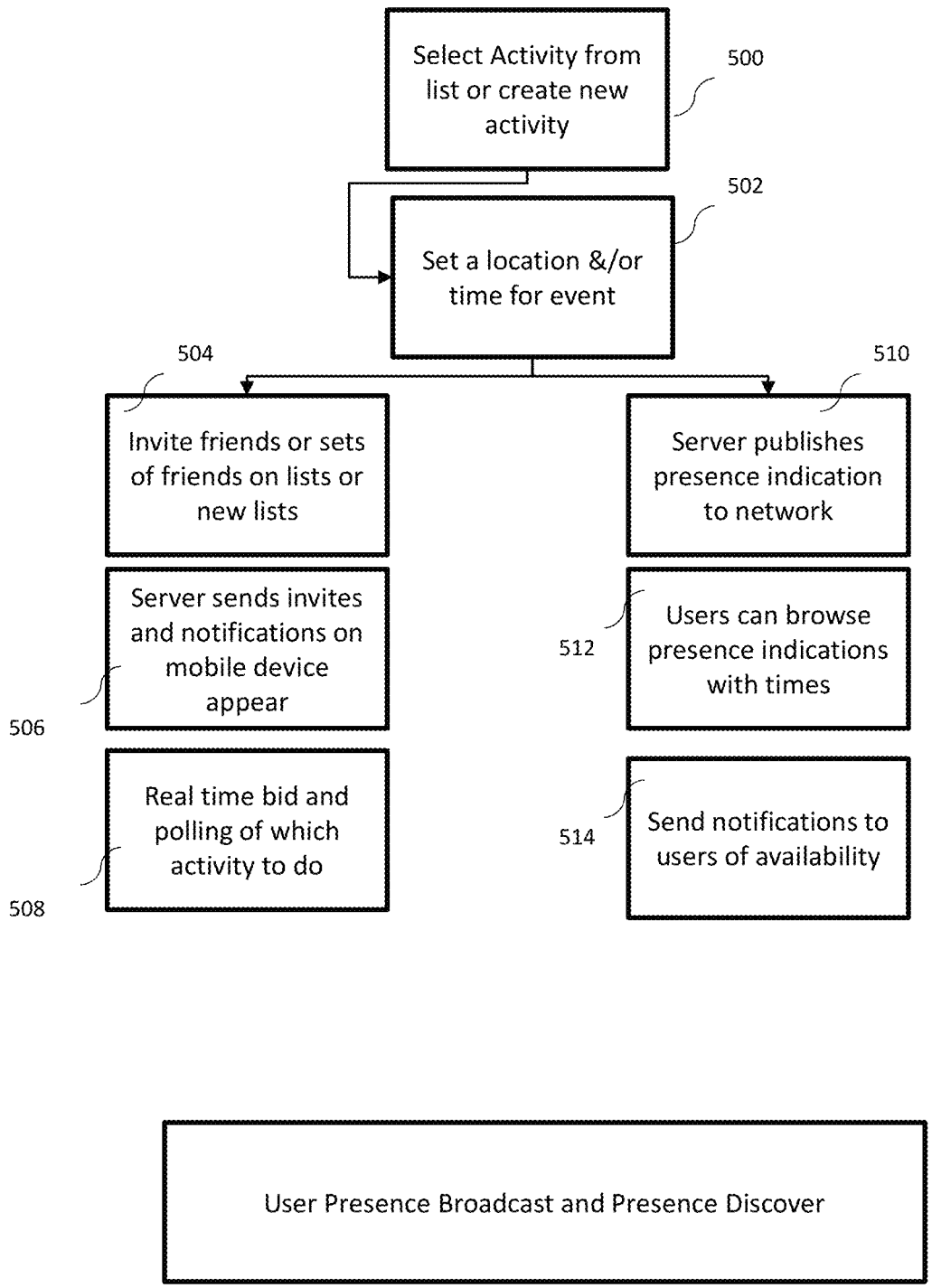
FIG. 5 depicts a flow for broadcasting and determining user presence based on lists.

Referring now to FIG. 5, FIG. 5 depicts two sample workflow approaches to determining an activity presence system. A first user or a plurality of users can select various activities or lists of activities or create a new activity 500. These user in turn is enabled to optionally select a location, time, or other event details 502. The user is enabled to invite friends to the activities 504 and these users are enabled to receive notifications 506. Users are in turn enabled to place bids 508 or indications for the activities. In a variation users may pofnst their status to be available for certain activities at certain times 510. A plurality of other users may be enabled to browse the availability of users 512 with times and or activities they are available for and interested in. Users are enabled to post their availability in real time to various activities 514.

Figure 6:
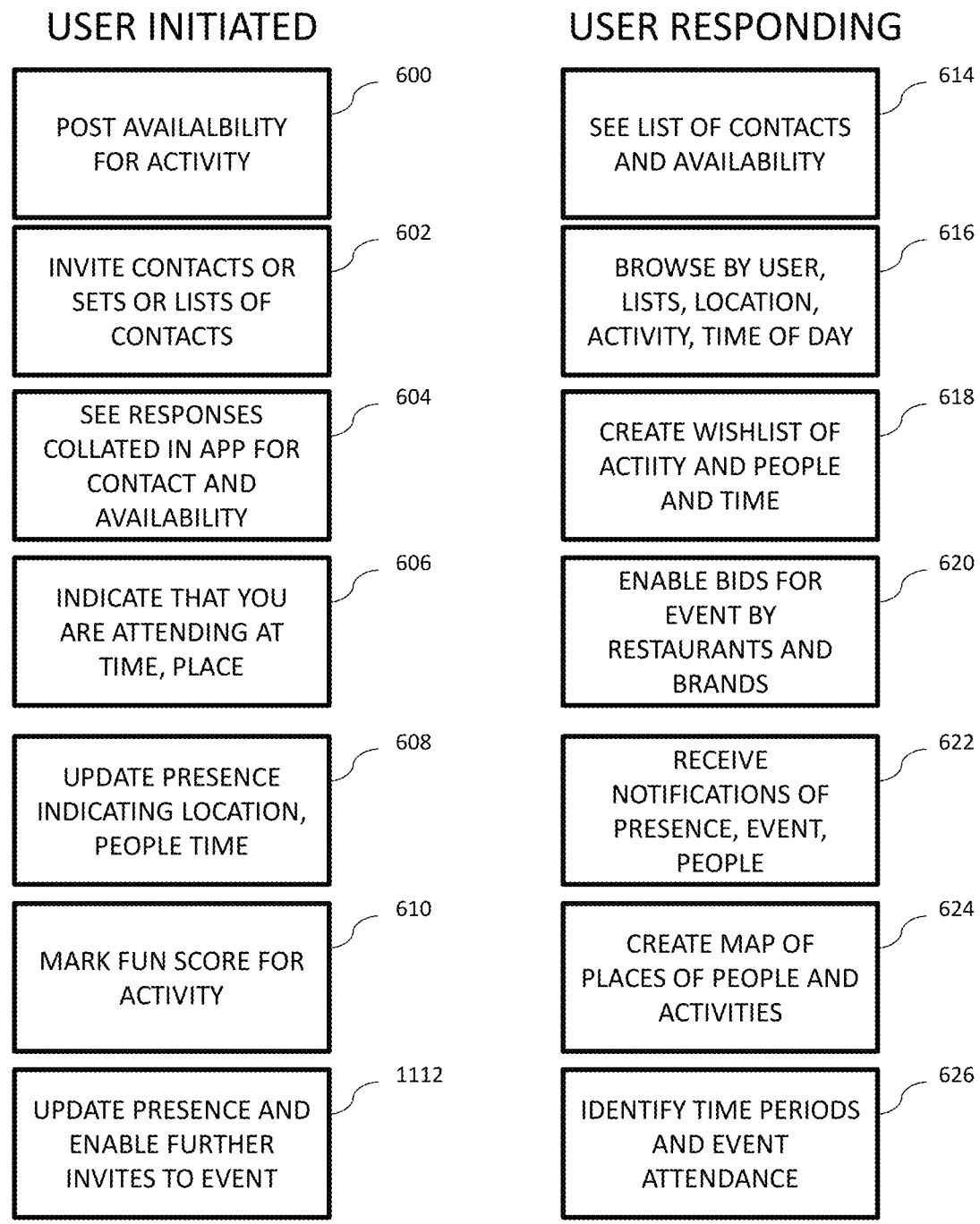
FIG. 6 depicts a user initiated and user response for presence data.

Referring now to FIG. 6, FIG. 6 depicts a first user broadcasting their presence to other users and other users responding to presence indications 600. A user may be broadcast their availability for their activity. A user may be able to invite contacts to their activity or create custom lists that can be saved for future use 602. Users can respond to various responses 604 using a mobile application. Individuals are enabled to indicate their availability using like, plus or other buttons 606. A presence system is updated in response 608 including location and people and time percent likelihood. Users can indicate pre or post event their like score 610 and these scores may be used to predict whether another individual should attend or whether the user will enjoy a future event. In another example, users may be able to respond to their presence based on lists of presences of other users 612. The mobile application and server may enable search for users or display users availability by location and by activity type and by hours 614. Users may be enabled to browse by user, lists, location, activity, time of day 616. Users are enabled to create wishlists of activities they would like to do with certain people and at specified times 618. Restaurants, retailers and brands are enabled to bid to host the events 620. Individuals are receive notifications of the presence of individuals 622. Users are further enabled to create a map of people and places in real time in terms of their location and activity 624. The system may automatically identify the optimal time for events 626 or recommend events from individuals organizations or companies.

Figure 7:
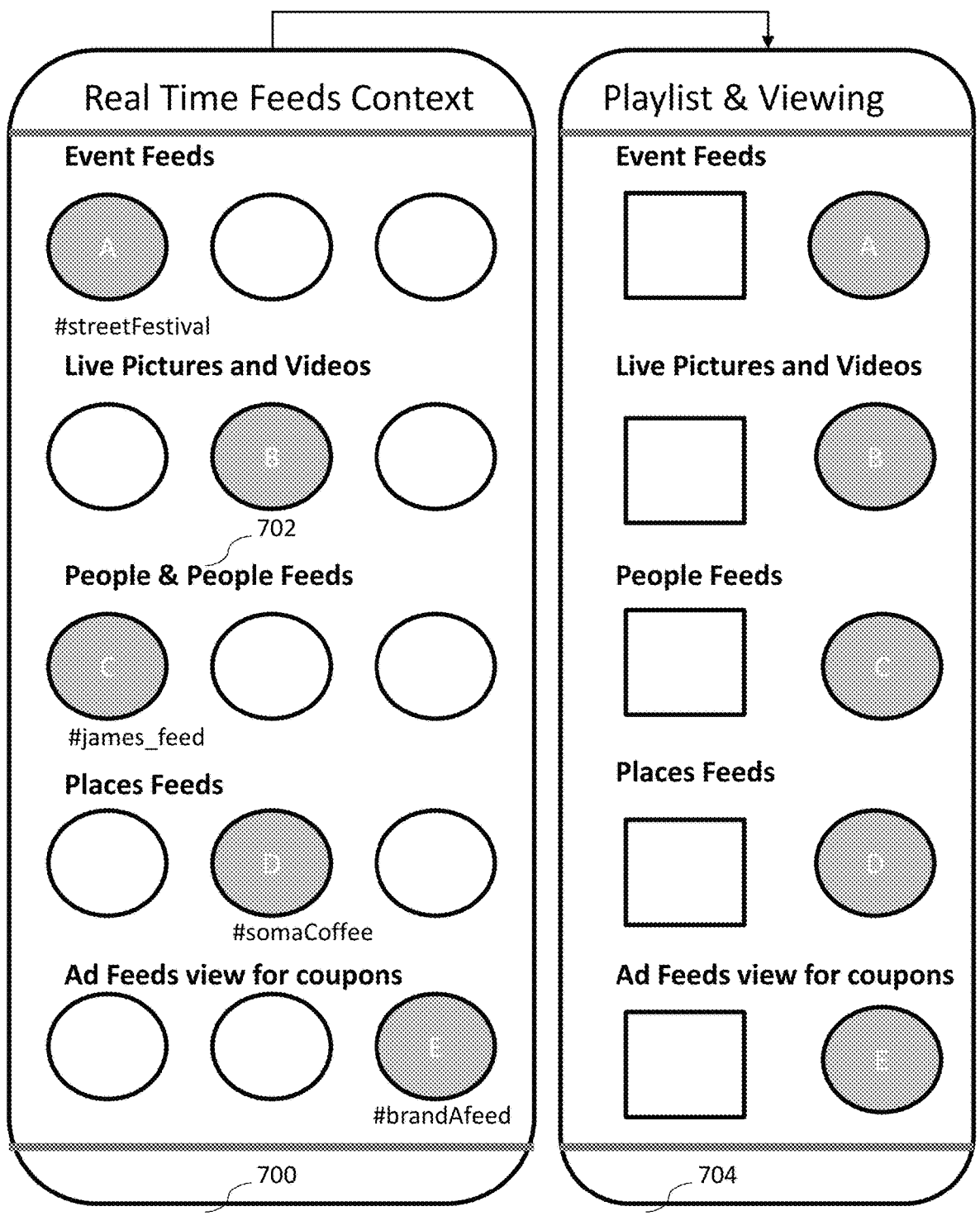
FIG. 7 depicts a mobile application with multiple feeds from live and past events, people, persons, places, and curated lists.

Referring now to FIG. 7, FIG. 7 depicts various live channels and events from people, places, advertisements, and organizations. These channels may include various pictures or sequences of media content organized into a story. Various feeds may be organized into channels 702. The mobile device application may further display various photos or multimedia content units side by side with channels to allow for simultaneous viewing and channel navigation 704. Customized playlists and channels may be created by the server or personalization module. A custom channel may be created specific to the user based on a mix of inherited content from various posts of individuals.

Figure 8:
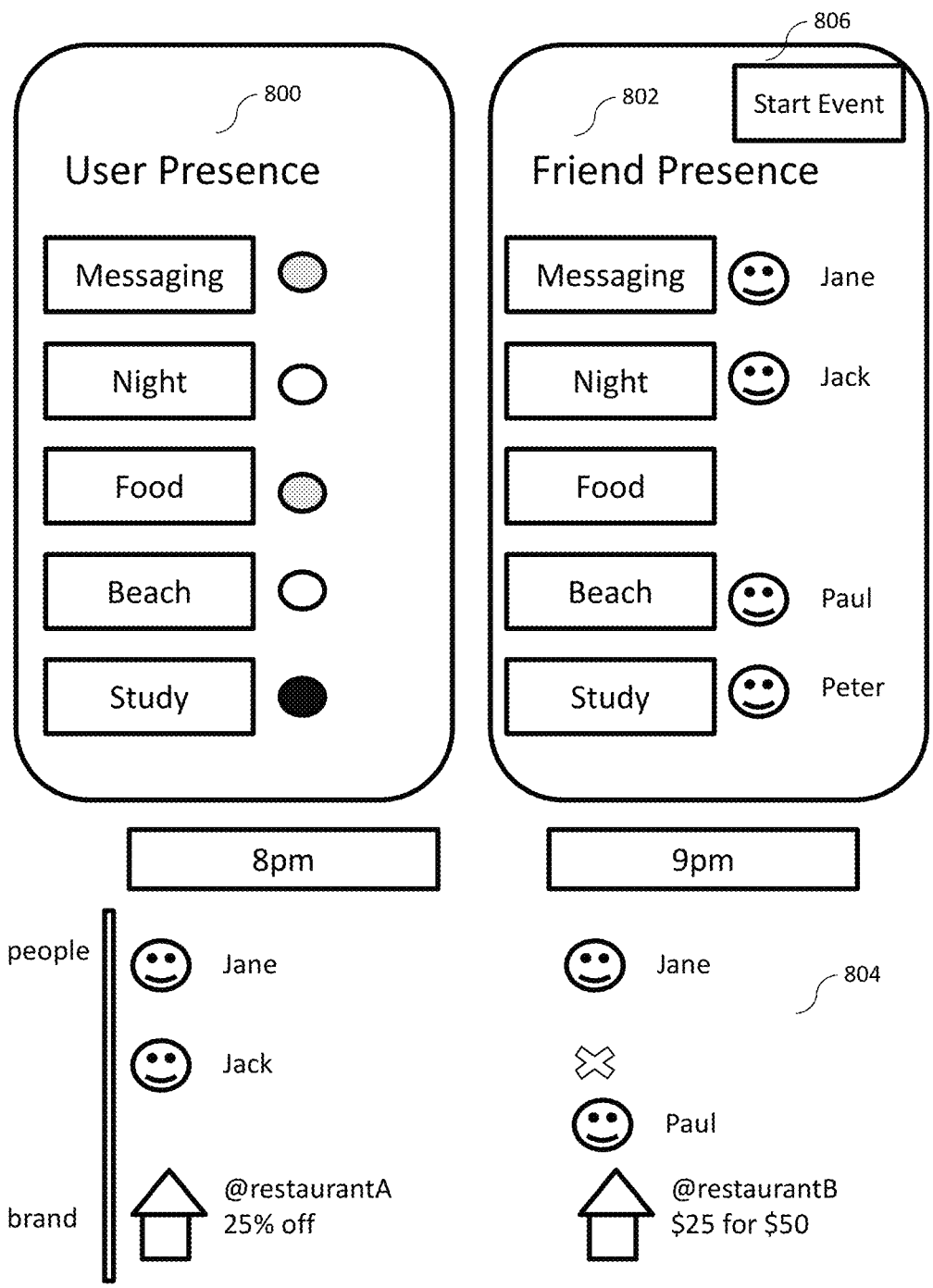
FIG. 8 depicts a presence system for individuals that seek to meet others and those that are available to meet others.
Figure 9:
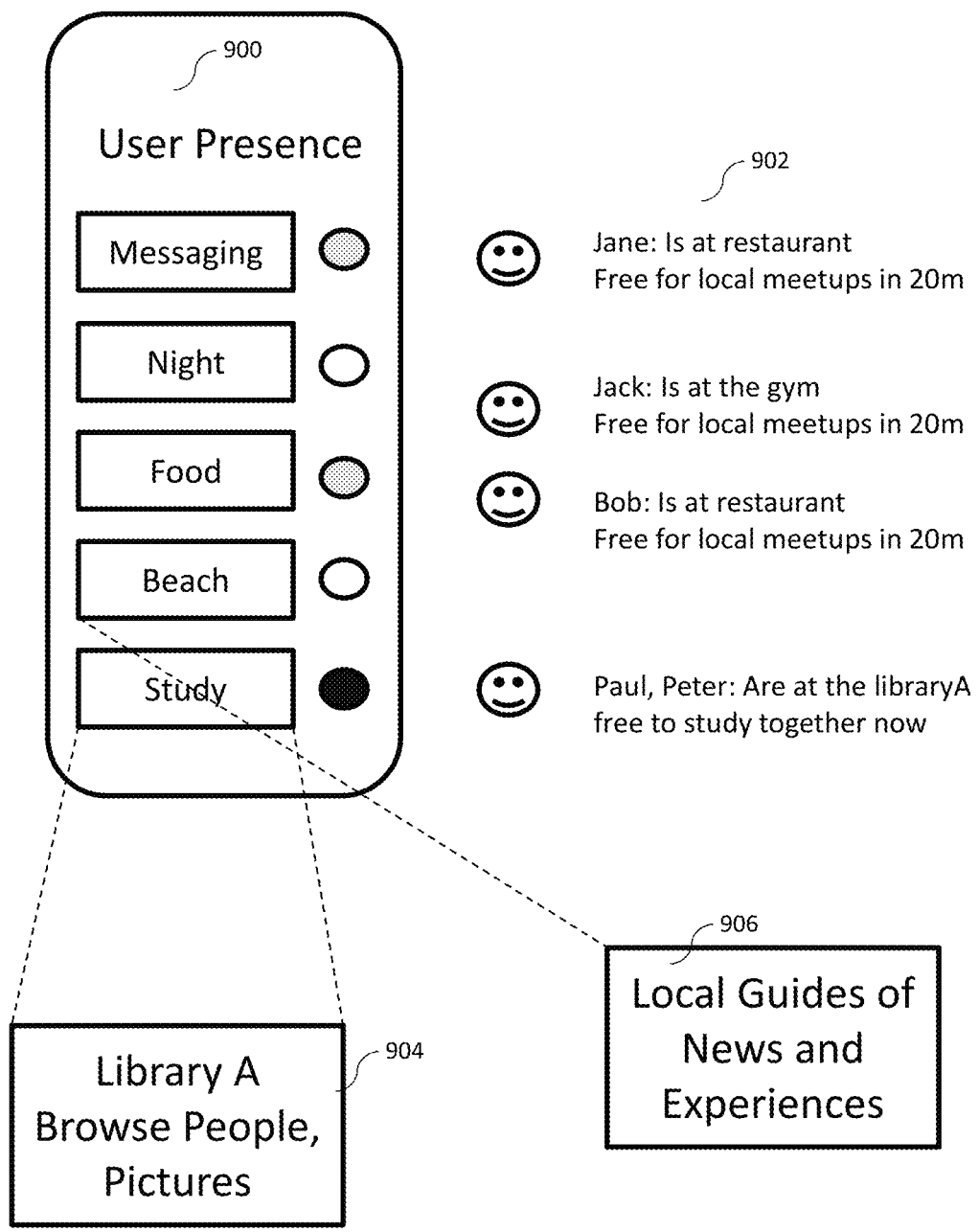
FIG. 9 shows a user interface with responses from various responses of individual's presence.

Referring now to FIG. 8, FIG. 8 displays a mobile application including user interface module which shows the activities of various individuals and their ability to meet or participate in one or more activities based on a time or other temporal indication. The mobile application interface is enabled to display buttons for activities and presence indicators color coded by the number of people that are interested in the activity and their availability per activity type. A user presence UI flow 800 enables a user to select activities they are interested in during a time period. The user presence UI flow allows a user to see the availability for people in their lists and other recommended individuals by activity type 802. For example, the user is enabled to browse availability for individuals who wish to study and those that wish to go to the beach. Each of these contacts can be messaged or accepted or a group invitation may be sent directly within the application 806. The platform enables a high granularity associated with the presence indications of individuals beyond online offline status. A presence server module tracks user presence at hierarchical levels such as available to meet, and further available to meet under when when and with whom. An anti availability network may be created in which an individual is enabled to notify members of their availability for which no social ties exist between the person and the people they are notifying. In various embodiments, a user is enable to brows by status via activity type instead of just browsing by person. A request may be made on the application which is processed locally by the mobile device and a cloud server to Referring now to FIG. 9, FIG. 9 depicts a user presence system comprising of activities of a first user and the first user's own buttons or UI components to fill out in order to express availability 900. The system may be implemented as a mobile application stored in a non-transitory computer readable medium to be executed by a processor on the mobile device or in conjunction with a cloud server system. The user's friends or other contacts may also be displayed on the mobile application to indicate their ability and availability to participate in various activities 202. This presence data may be organized by activity by contact by time by location other filters or combinations thereof. The availability may also be displayed with various individuals availability by time listed on a screen in addition to the bids from restaurants or companies on any deals they will offer the group should the group choose to dine or shop with the restaurant or company. A first restaurant may offer 25% off if the group joins that night. Another one may offer a better table or a reservation via an online reservation system. The UI system enables multiple windows so that events may be previewed prior to agreeing to attend. As an example, a hardpress against one event can popup a second window 904, 906 on the mobile device to preview statistics about the event in terms of attendees and past pictures of the place.

In one or more embodiments, presence may be identified using a button click method in which users broadcast their desires to be available to sets of their social network. In order to prevent one set from sharing the details with another set of friends which may overlap, responses to the availability system are collected via a server and under a privacy setting may allow for aggregated presence from multiple individuals prior to identifying specific users. In other embodiments, when the number of individuals is smaller, the full presence details may be available to the users in the list.

Figure 10:
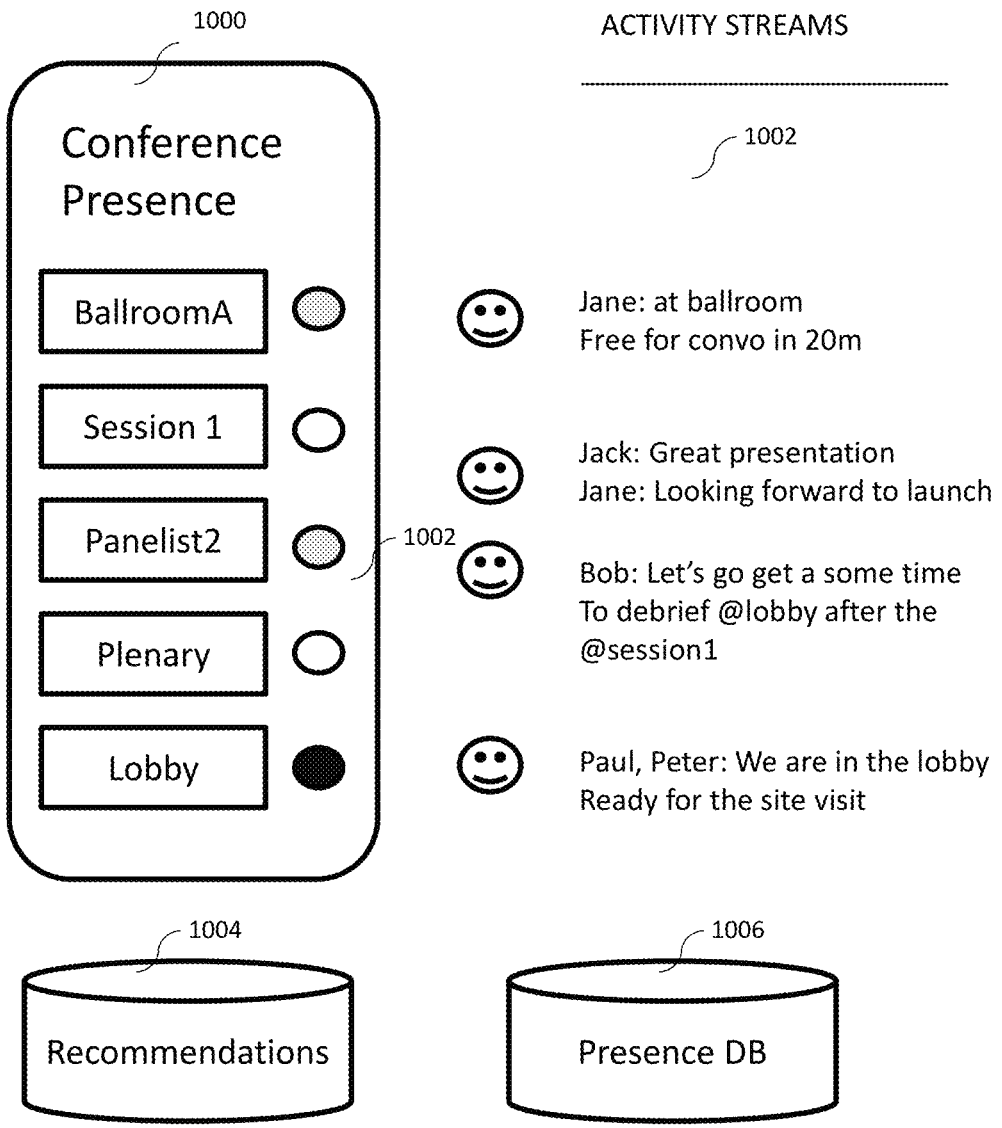
FIG. 10 depicts a conference attendee presence user flow.

Referring now to FIG. 10, FIG. 10 depicts a mobile application including presence for various users at a conference. As an example, a mobile feed may be enabled for various conference attendees. The application may determine users locations based on wifi, Bluetooth, GPS or other indoor and outdoor location positioning systems. The application may create group chat threads dynamically within the room. The ability to authenticate an individual to a thread may be based on a layer 2 or layer three indication of their presence on the same network. The layer 2 and layer 3 authentication may be fed to a the mobile layer 7 application per network stacks. The authentication to these various network interfaces enables the application to send its MAC and ip address to one or more servers which verify the user to be in the location. In order to further prevent spoofing of network connectivity an mobile device may be authenticated locally via Bluetooth or another hyper local mesh network with other mobile devices with the social networking application or with a local beacon device. Various attendees may be listed in the application 1000 by location with an indicator related to the number of people in attendance 1001. An activity stream may be created as a channel related to the event 1002. A recommendation database and server may recommend people to connect with at the event 1004 while a presence database can track users availability to meet for one or more activities 1006.

Figure 11:
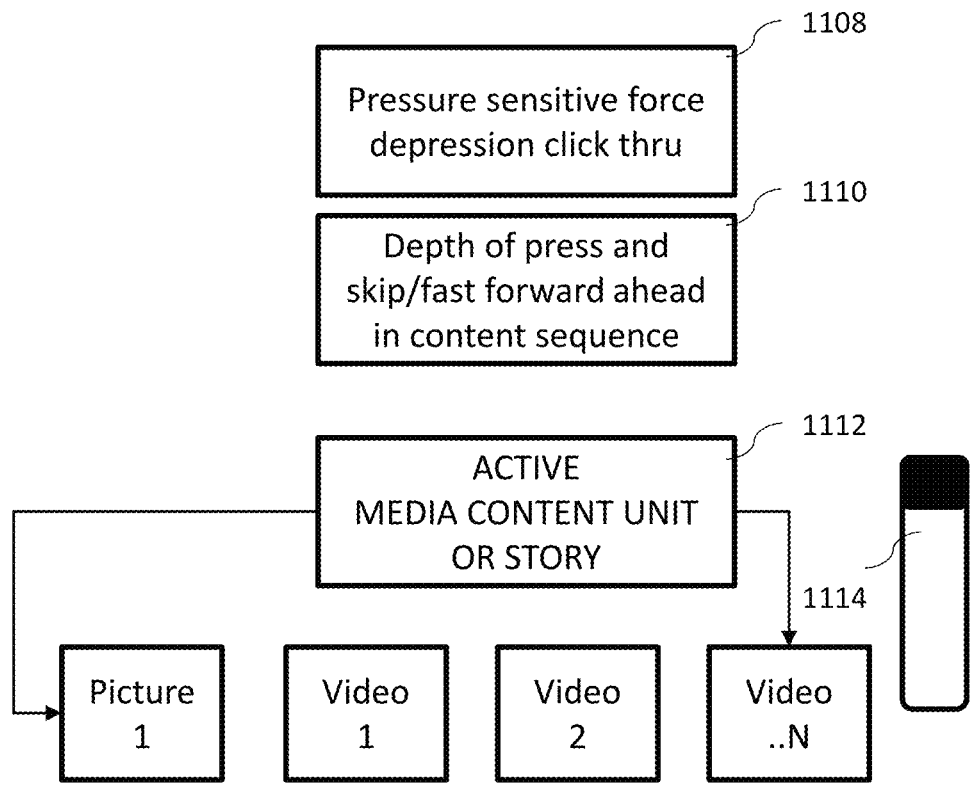
FIG. 11 depicts a various gestures on a mobile device.

Still referring to FIG. 11, the social networking application may incorporate pressure sensitive feedback 1108 and allow uses and to fast forward thru sequences 1110 based on the duration and force of a press. A finger depression 1112 may for example enable a slider bar of various content forms to appear beneath a main content unit allow for fast swiping through a channel or a story to the most relevant items for that user. Each content unit may be associated with a separate indicator for time to live, automatically clipping the content, or another factor. The mobile application is enabled to maintain the pictures on the top portion of the mobile device display while maintain a slider bar of story elements in the bottom half of the display screen.

Figure 12:
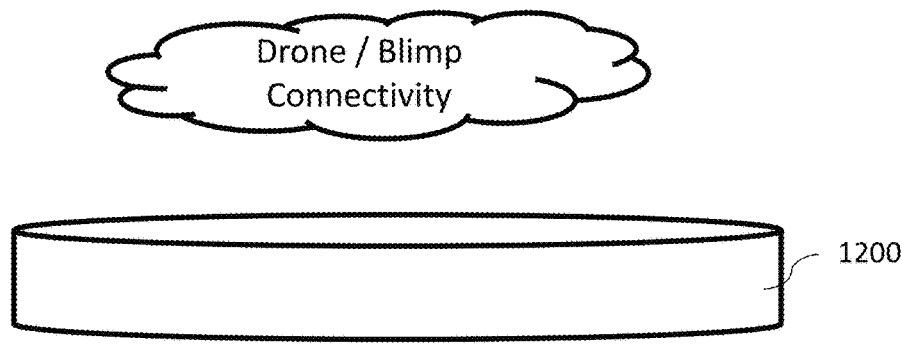
FIG. 12 depicts a local messaging subsystem with an intelligent assistant for local wireless communication.
Figure 12:
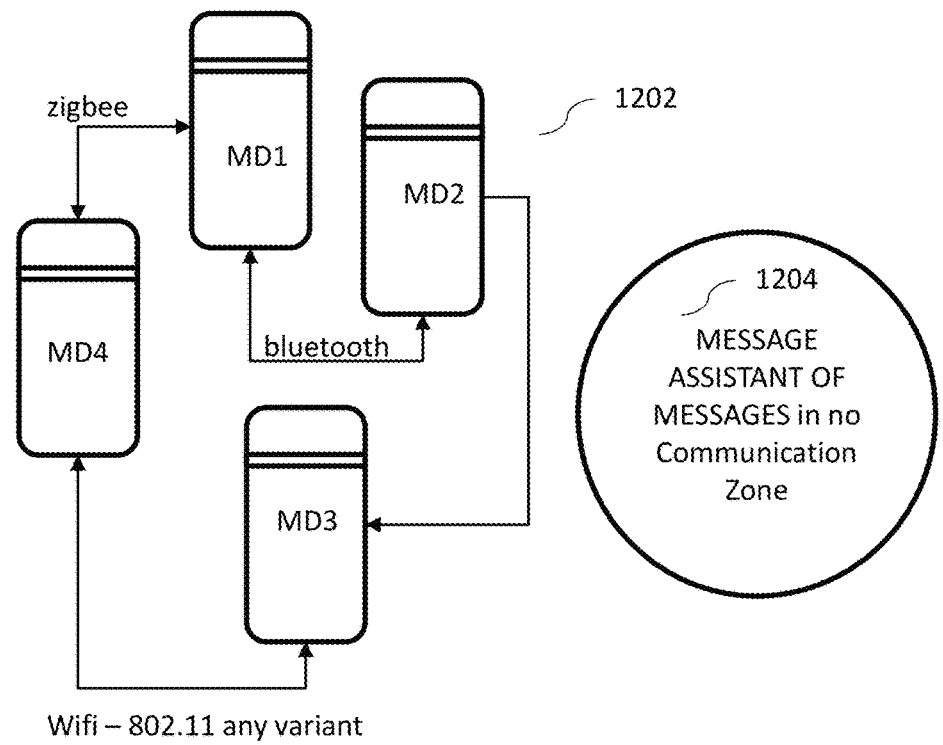

Referring now to FIG. 12, FIG. 12 depicts a mesh network with messaging capabilities between the users. Users are enabled to communicate using one or more protocols including zigbee, Bluetooth, wifi 1202. These devices may be enabled to communicate with a bot or message assistant which is enabled to hold messages and store and forward these for future use 1204. The bot messaging device may hold message till connectivity improves or until a future time or date. In various embodiments may include: Social Messaging Fail Over Networks by using different networks simultaneously or sequentially to send or receive messages and content; optimizing chat via one two or three, creating mesh networks for message transition for using peer to peer and cloud based networking for messaging, storing messages on one or more devices without the use of a server.

Still referring to FIG. 12, the social networking platform may be enabled with an optimization module which selects which messages to download and prioritized based on the availability of various wireless channels and peer to peer networks, various messaging and routing protocols, and the size of the content units to be downloaded. As an example, a social networking service may allow for messaging between users via one or more wireless mobile devices. These devices may be enabled with cellular, wifi, Bluetooth, zigbee or other local wireless protocol for peer to peer networking. Certain areas such as stadiums or concerts may be overloaded and therefore a offload of conversation traffic to non cellular systems may be effective in maintaining connectivity.

Figure 13:
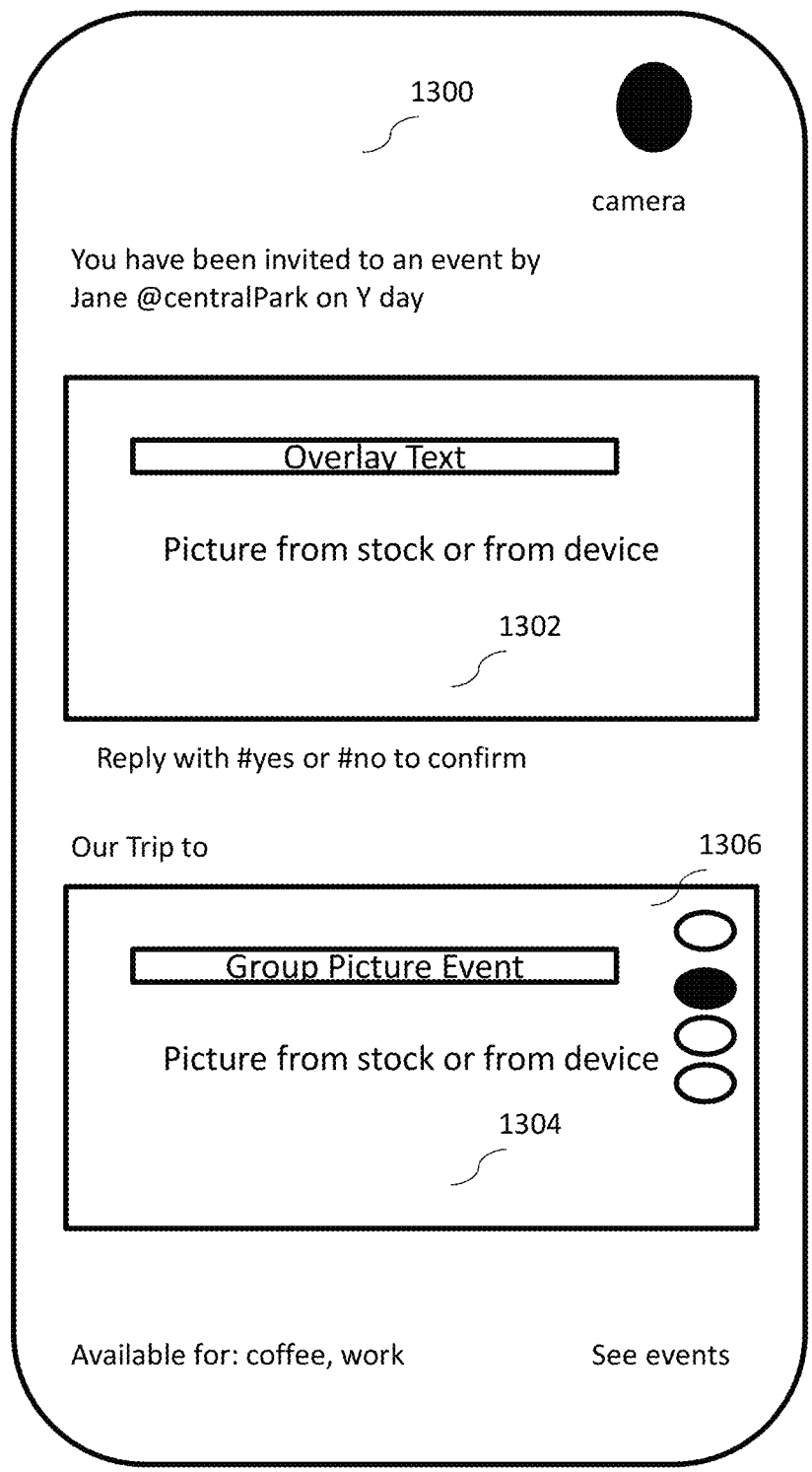
FIG. 13 shows integrated interactive content units.

Referring now to FIG. 13, FIG. 13 depicts units of content may be enabled. As an example, a stack or story may be listed as a unit 1302 and 1304 and be comprised of other underlying items. A click on a card stack may bring an interface which allows the user to swipe right through multiple cards 1306. A filled in indicator indicates that the user is on the $2^{nd}$ item of the set.

Figure 14:
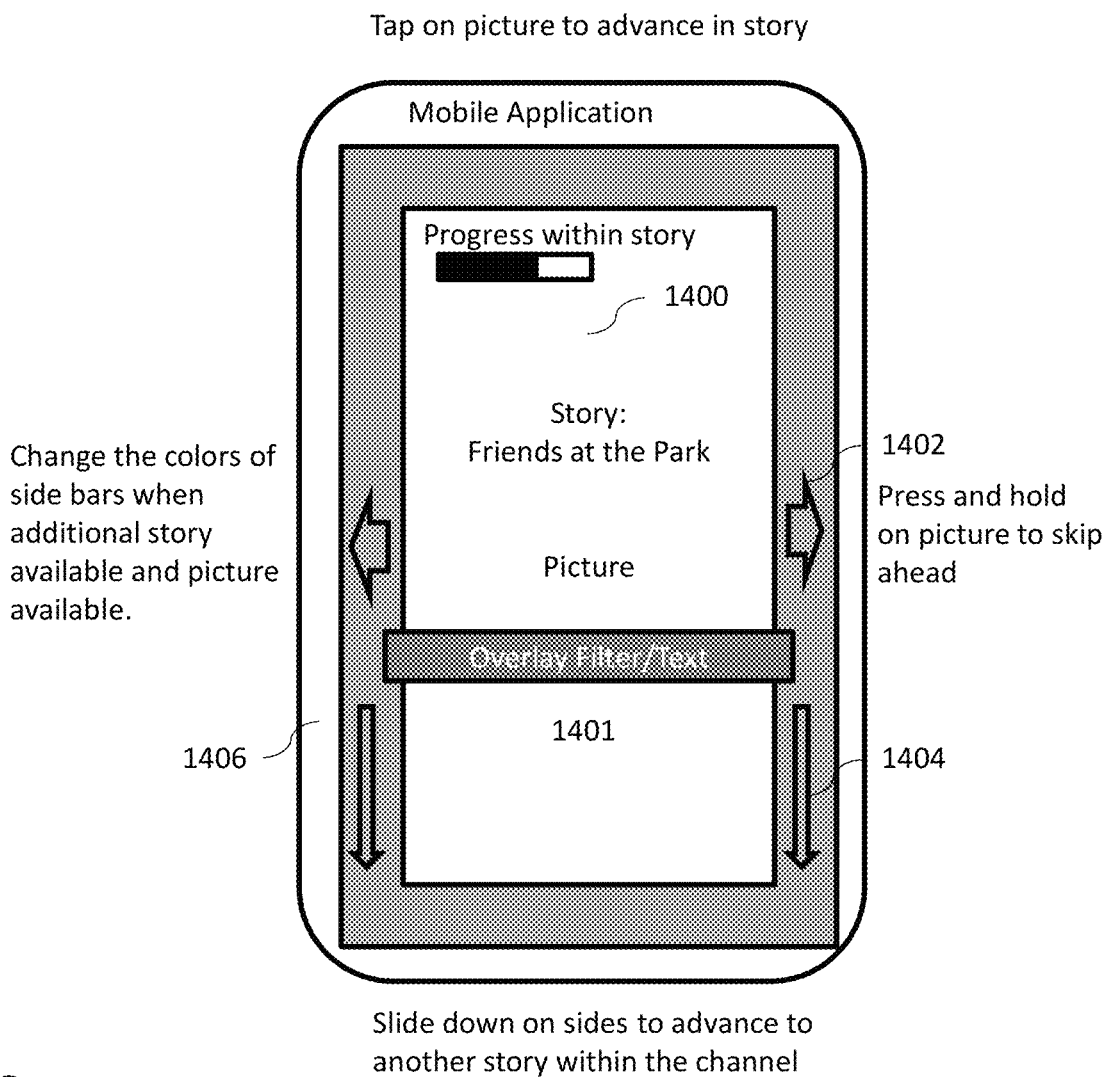
FIG. 14 shows a gesture based interface with a picture and multimedia application.

Referring now to FIG. 14, FIG. 14 depicts a mobile application executed by a processor on a mobile device, wherein the mobile device application may be written in a plurality of instructions stored in a volatile or non volatile memory. A story is available in a center area of the application 1400 including a picture and overlay text on top of the image. A story may be advanced via several gestures, including a tap left or right 1402. A story including a user generated story or a $3^{rd}$ party story such as a news story from a media content partner or a video from a studio may be advanced by sliding down on the mobile application 1404 may advance to another story. Movement to the device such as a shake, a raise in the air, or a change to the proximity sensor or gyroscope may be enabled by raising the device. In various instances, a color may change based on whether there are available stories or not. Various combinations of gestures may be performed simultaneously to enable capture of data and stories and pictures including a first finger depression in the center of the screen and a swipe down the device on the side of the screen.

Still referring now to FIG. 14, various filters and overlays may be added to images to augment or change people including a face change, a face zoom, a face mashup, or a 360 degree video. As an example, a picture of a first person in one image may be swapped with a picture of another person. Image mashups and video mashups that alter people, objects, and other factors may be enabled. A video that shows a person for example in one setting may be altered and changed to a second setting such as a visit to London being changed to Paris or vice-versa. In various embodiments, content from a mobile device, wearable device, smart glasses, watch device, or other system may be used to create a full story or memory of an individual.

Still referring to FIG. 14, FIG. 14 displays a message on a mobile device 1400. An invitation may be sent with a an image as a background, overlay text. RSVPs to the event may be obtained via a simple messaging command including a #yes or a #no. The invitation module may be comprised of an image obtained via the social networking application, the pictures on the phone, stock footage, or a third party image. Overlay text may be placed on top of the image. This unit may then be converted into a second image to be sent to one or more invitees.

It is an aspect of the present disclosure to enable billboard like advertisements within image entities. As an example, a picture of two individuals walking on a street may feature various background image entities such as shop names, cars, and restaurants. In an altered advertising supported mode, key elements of the background environment may be changed base d on an advertisements. Overlay image and text may be placed on top of objects in a photo or video. For example, a QR code, coupon, or discount code may be placed on a window of a building in the background. A click on this sub image aspect may bring up a pop-up window of an advertisement.

Alternatively, micro-environment backgrounds may also be changed to make cloudy days appear sunny or change one store name to another store name. The 360 video capture may further enable a user to view and rotate a video in multiple directions including left right up down diagonal. In these instances, the rotation of the video in different areas may include various advertisements above and below and calls to action.

It is an aspect of the present disclosure enables various modes for a mobile application. As an example, a mobile application may be enabled to default to a view a camera application first or a stories page first.

Figure 15:
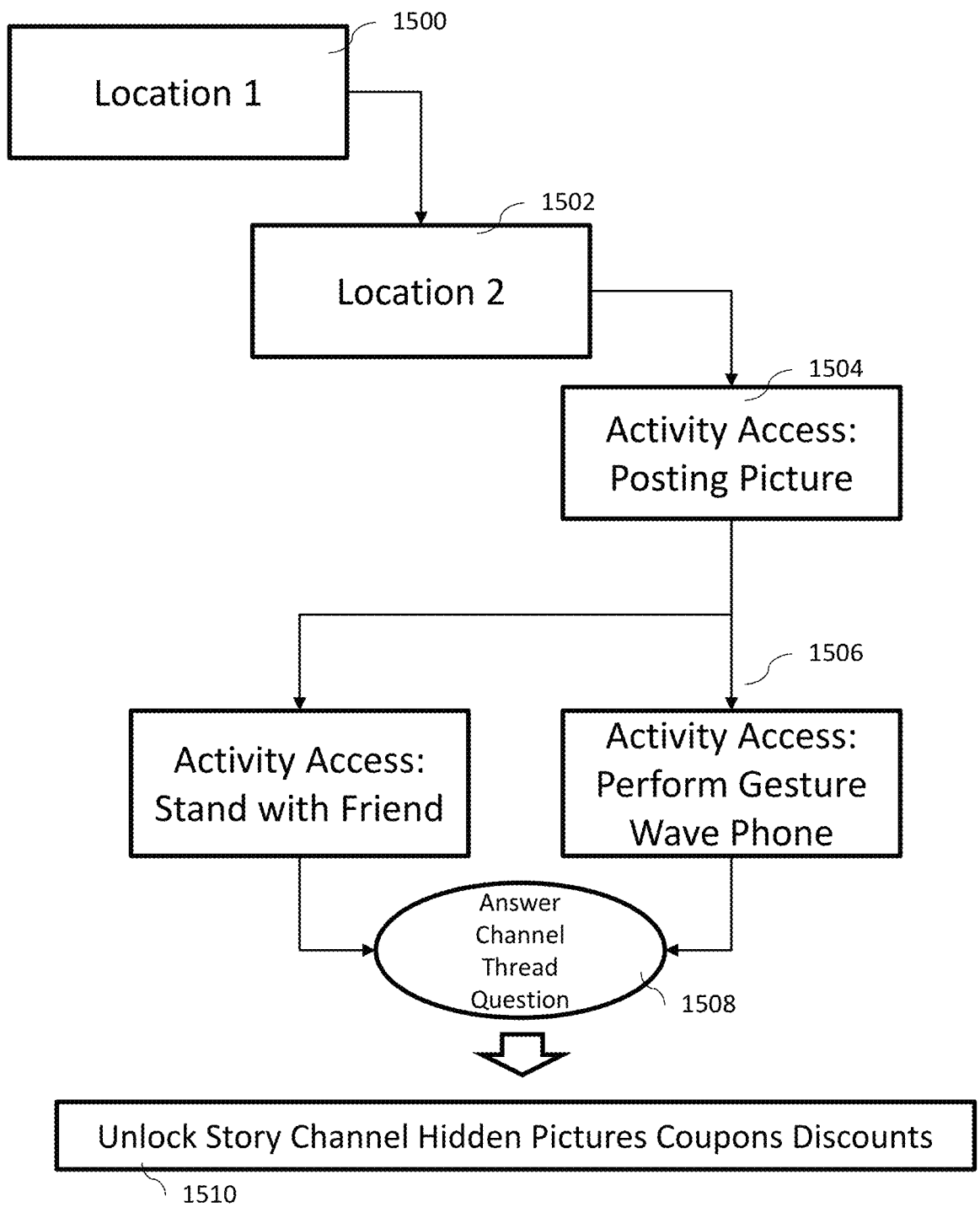
FIG. 15 depicts a sequence of sequence of steps for a user to undertake to access various stories including a gesture.

Referring now to FIG. 15, FIG. 15 depicts a sequence of simultaneous or sequential hierarchical or non-hierarchical sequence of actions for a user to unlock stories, channels, pictures, groups, coupons, and discounts 1510. A user for example may visit a first location 1500 and a second location 1502 and a set of activity functions such as posting a picture 1504, sharing an item with a friend or performing a gesture 1506 and interacting with a bot 1508. These bots may for example be created by a brand or a retailer to offer coupons or hidden menu items for a restaurant.

In one or more embodiments, the social networking and messaging platform may have features including issuing status updates with timer clock in which it counts down, creating channels and groups based on events, location and occasions, creating stories based on specific content items from one or more users in one or more channels, and removing postings from users in their social network and only displaying those postings in their anti-social network of users that they do not overlap with and without identifiable information.

The platform may be enabled to create a 360 images to stitch together multiple videos into a panoramic video for augmented reality and virtual reality. A 360 video may be for example entered as a gaming challenge to generate content for a channel or private group.

In one or more embodiments, a user may be enabled to create or join a network, a group, or a channel. Each network, group or channel may have a privacy setting associated with it and a hierarchy setting associated with it. Channels and groups may be assembled by activity indicators. A game or challenge question may be enabled by a bot or user agent to drive interactivity.

In various embodiments, it will be understood that aspects may be built in to instructions and software stored in a non transitory computer readable medium for execution by a processor on one or more servers mobile devices or wearable devices. Various memory types maybe used to store instructions and data including volatile and non volatile memory.

The foregoing description of specific embodiments of the present disclosure have been presented for purposes of illustration and description. They are not intended to be exhaustive or to limit the disclosure to the precise forms disclosed, and it should be understood that many modifications and variations are possible in light of the above teaching. The embodiments were chosen and described in order to best explain the principles of the present disclosure, and its practical application, to thereby enable others skilled in the art to best utilize the present disclosure and various embodiments, with various modifications, as are suited to the particular use contemplated. It is intended that the scope of the disclosure be defined by the Claims appended hereto and their equivalents.

What is claimed is:

1. A method comprising:
   generating, by at least one server, a story associated with a profile of a venue, wherein the story comprises of a plurality of content units from one or more users;
   organizing, by the at least one server, the plurality of content units within the story as a sequence and further associating the story to a location;
   displaying, by a user interface of a first mobile device application associated with a user, the story such that a gesture of a swipe enables the advancement between a first and a second of the plurality of content units in the story; wherein the story is accessible by the first mobile device application upon the at least one server receiving from the first mobile device application a response to an activity challenge specific to the location; and displaying, by the user interface of first mobile device application associated with the user, a progress bar updated based on advancement between the plurality of content units in the story.

2. The method of claim 1, wherein access to the story by a separate user mobile device application is limited to a pre-determined period of time.

3. The method of claim 2, comprising:
setting a geo-fenced area around the location to encompass an area larger than the venue; and
providing accessibility on a display on a separate mobile device user interface to the story based on the separate user's mobile device indicating its location to the at least one server.

4. The method of claim 3, wherein the separate user mobile device application is enabled to view the story based on being a registered member of a set of users in a social networking service.

5. The method of claim 4, further comprising:
enabling a gesture of a swipe downward across the user interface to the advance from the story to a separate second story.

6. The method of claim 5, comprising:
providing, by the server, for a digital vault of a plurality of stories each associated with one or more venues; and
responsive to the first mobile device providing its location to the at least one server, displaying on the user interface an indication of available stories.

7. The method of claim 1, comprising:
generating by the at least one server a dynamic story generator module that creates a digest story based on selected ones of the plurality of content units from the user and a plurality of different content units from one or more separate users.

8. The method of claim 7, wherein the selection of the plurality of different content units is based one or more of an event post, a weekend time period, and/or a third-party news post.

9. The method of claim 8, wherein the dynamic story generator further comprises:
creating a live story based on a plurality of event content units posted by the one or more separate users.

10. The method of claim 9, comprising:
displaying simultaneously, by the user interface of the mobile device, a plurality of channels comprising of at least one live story and at least one story of the one or more separate users.

11. The method of claim 10, comprising:
receiving by at least one server a plurality of presence and availability indicators for the user and the one or more separate users.

12. The method of claim 11, comprising:
matching the user and at least one of the one or more separate users based on the presence and the availability indicators to a scheduled event; and
generating a new story associated with the scheduled event accessible to at least the user and at least one of the one or more separate users.

13. The method of claim 1, comprising:
providing for an overlay on an image of at least one of the plurality of content units;
generating an augmented reality view of at least one of the plurality of content units; and further animating the display of the advancement between multiple ones of the at least one plurality of content units within the story.

14. The method of 13, comprising:
deleting the story based on the number of views by one or more separate users of the story.

15. The method of claim 1, comprising:
generating an activity challenge to drive creation of content for the story that includes criteria for the activity challenge;
identifying a group of users to engage in the challenge;
receiving by the at least one server, a plurality of posts from the group of users; and
as each one of the plurality of posts are received, providing for display on one or more user interfaces an indication of the number of the plurality of posts received.

16. A non-transitory computer readable storage medium that stores a set of instructions that when executed by at least one processor of a mobile device cause the mobile device to perform a method comprising:
generating a story coupled to a venue that comprises of a plurality of separate content units generated by the mobile device;
organizing the plurality of content posts within the story as a sequence and further associating the story with the venue with a geo-fenced location;
displaying, by a user interface, the story such that a gesture of a swipe enables the advancement between the plurality of separate content units in the story; wherein the story is accessible by the non-transitory computer readable storage medium upon completion of a response to an activity challenge specific to the geo-fenced location; and
displaying, by the user interface of a first mobile device application associated with a user, a progress bar updated based on advancement between the plurality of content units in the story.

17. The non-transitory computer readable storage medium of claim 16, wherein the set of instructions that are executable by at least one processor of mobile device cause the mobile device to further perform:
enabling the viewing of a separate user's story based on a location provided by the mobile device to a server.

18. The non-transitory computer readable storage medium of claim 17, wherein the set of instructions that are executable by at least one processor of mobile device cause the mobile device to further perform:
receiving a story of a separate user from a server and deleting the story after a pre-determined number of views.

19. The non-transitory computer readable storage medium of claim 18, wherein the set of instructions that are executable by at least one processor of mobile device cause the mobile device to further perform:
receiving from at least one server a presence an availability for a plurality of users including a first user and a second user.

20. The non-transitory computer readable storage medium of claim 19, wherein the set of instructions that are executable by at least one processor of mobile device cause the mobile device to further perform:
receiving from the server a match of the first user and the second user based on the presence and the availability to a scheduled event, and an indication of a new story associated with the scheduled event.

* * * * *